(12) United States Patent
Schlags

(10) Patent No.: US 9,192,529 B1
(45) Date of Patent: Nov. 24, 2015

(54) FOUR-WHEELED RESCUE LITTER

(71) Applicant: Michael L. Schlags, Buellton, CA (US)

(72) Inventor: Michael L. Schlags, Buellton, CA (US)

(*) Notice: Subject to any disclaimer, the term of this patent is extended or adjusted under 35 U.S.C. 154(b) by 0 days.

(21) Appl. No.: 14/480,418

(22) Filed: Sep. 8, 2014

(51) Int. Cl.
   *B62D 53/00* (2006.01)
   *A61G 1/02* (2006.01)
   *B60D 1/48* (2006.01)
   *B60D 1/06* (2006.01)

(52) U.S. Cl.
   CPC ............ *A61G 1/0237* (2013.01); *A61G 1/0212* (2013.01); *B60D 1/06* (2013.01); *B60D 1/481* (2013.01); *B60D 1/485* (2013.01)

(58) Field of Classification Search
   CPC ..... A61G 1/0237; A61G 1/0212; B60D 1/06; B60D 1/481; B60D 1/485; B60D 13/00
   USPC .............. 280/408, 409, 410, 442, 419, 47.34, 280/47.35, 79.11, 79.2, 87.01
   See application file for complete search history.

(56) References Cited

U.S. PATENT DOCUMENTS

| | | | |
|---|---|---|---|
| 826,026 A | 5/1906 | Stokes | |
| 1,109,083 A | 9/1914 | Saltis | |
| 4,953,886 A | 9/1990 | Grant | |
| 5,398,358 A | 3/1995 | Mercke et al. | |
| 6,698,811 B1 | 3/2004 | Schuchman | |
| 6,824,150 B2 | 11/2004 | Simione | |
| 7,044,496 B2 | 5/2006 | Holmes | |
| 7,131,666 B1 | 11/2006 | Jenney | |
| 7,150,465 B2 | 12/2006 | Darling | |
| 7,210,697 B2 | 5/2007 | Simpson | |
| 7,926,833 B2 * | 4/2011 | Hellbusch | 280/442 |
| 2003/0150059 A1 | 8/2003 | Sawatzky | |
| 2007/0296168 A1 * | 12/2007 | Dahl | 280/47.35 |
| 2012/0000718 A1 | 1/2012 | Berrett et al. | |

FOREIGN PATENT DOCUMENTS

WO WO2010128498 11/2010

* cited by examiner

*Primary Examiner* — Kevin Hurley
*Assistant Examiner* — Marlon Arce
(74) *Attorney, Agent, or Firm* — Albert O. Cota

(57) ABSTRACT

A four-wheeled rescue litter (FWRL) comprised of an elongated upper rail that is vertically spaced from an elongated lower rail by a plurality of vertical posts. Attached to the elongated lower rail is a litter base that can be permanently attached or removably attached which allows the litter base to be removed for maintenance, or to replace a damaged litter base. Near the front end of the elongated lower rail is attached a pair of swivel wheels that allow the FWRL to be easily steered, and near the rear end of the elongated lower rail is a pair of fixed wheels that stabilize the FWRL when been moved. Near the front end of the elongated upper rail is located a yoke having an attached handle that is used to pull or push the FWRL. When the handle is not in use, it can be rotated and placed against the upper rail. Extending from the front of the FWRL is a vehicle interface attachment structure that facilitates the attachment of the FWRL to a vehicle by use of a ball hitch.

21 Claims, 8 Drawing Sheets

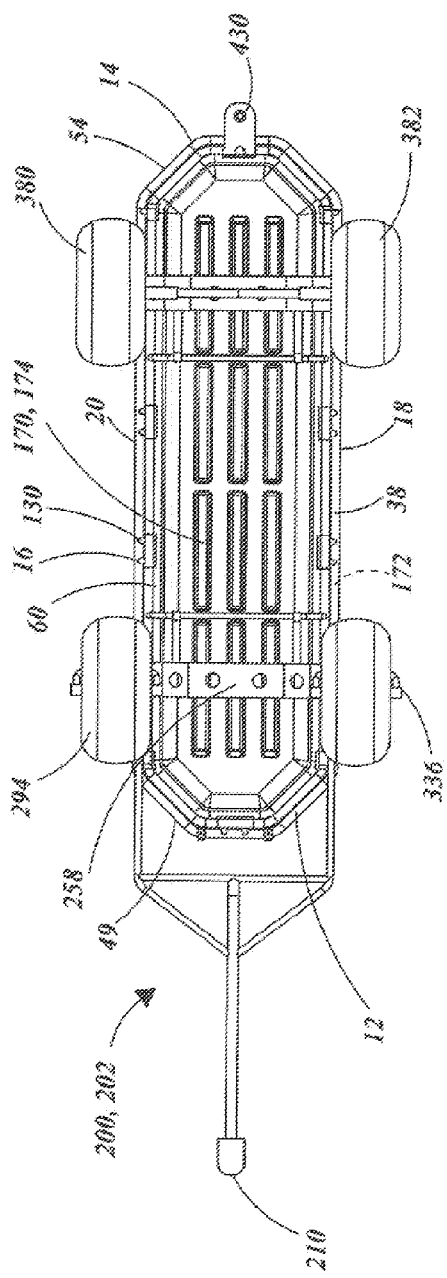
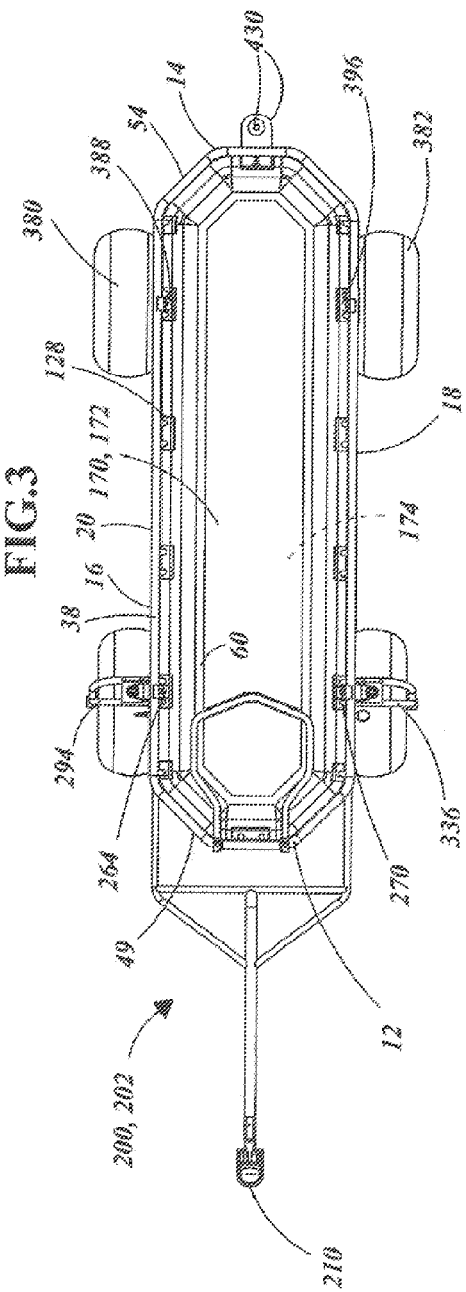

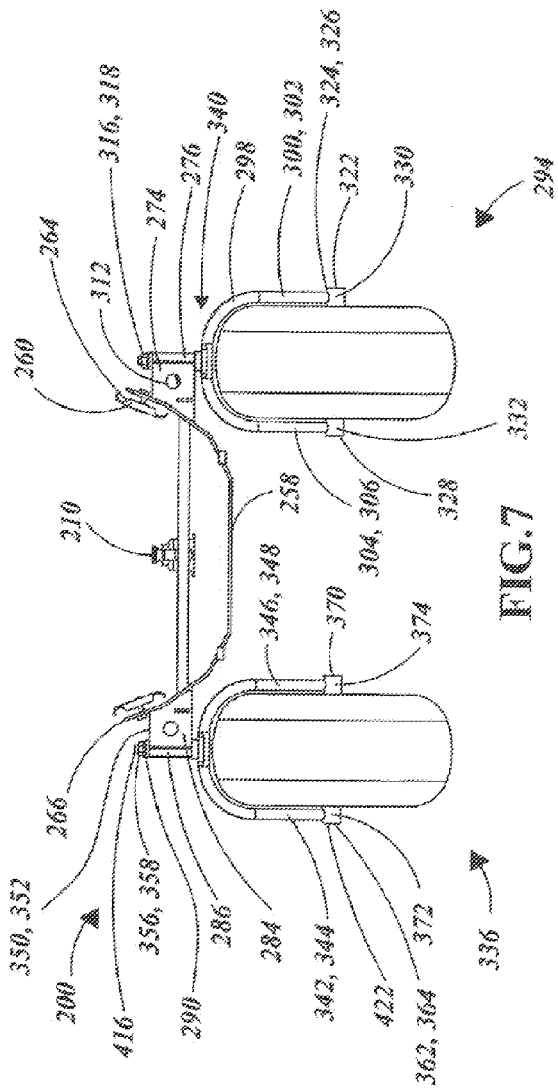
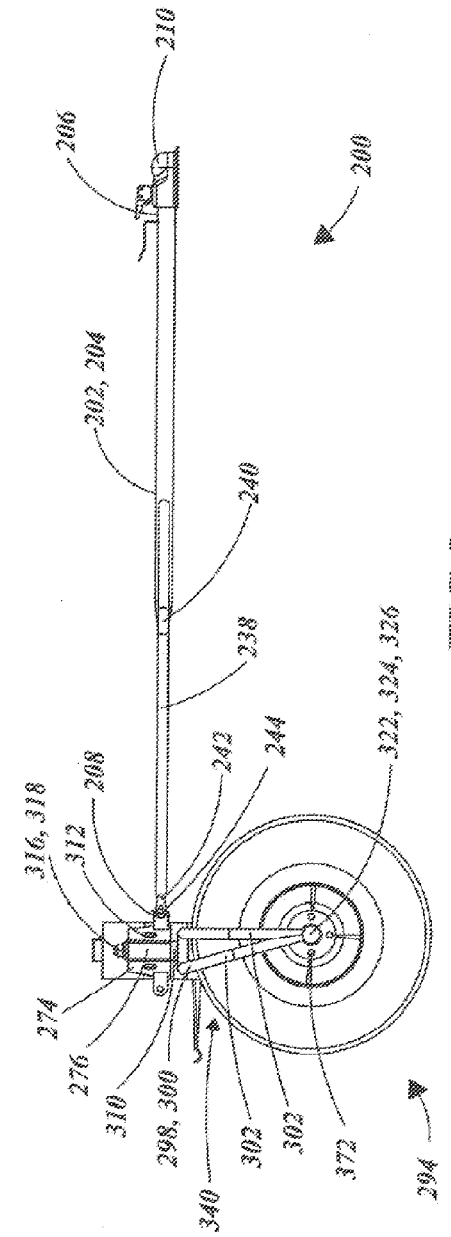

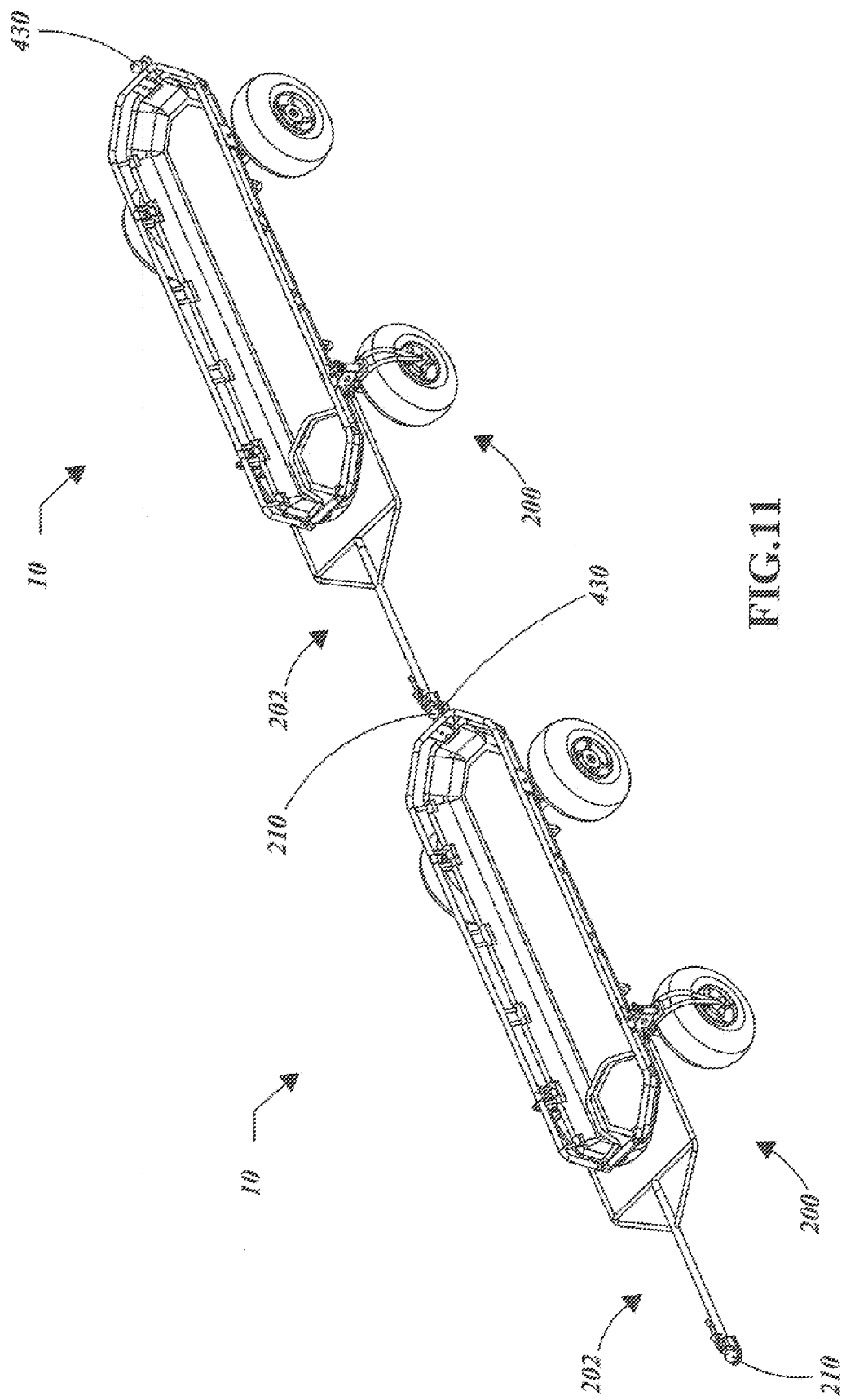

FOUR-WHEELED RESCUE LITTER

TECHNICAL FIELD

The invention generally pertains to rescue litters and stretchers and more particularly to a four-wheeled rescue litter that allows a single person to transport an individual over various types of terrain.

BACKGROUND ART

Rescue litters are utilized by rescue personnel to transport an injured person to a waiting medical transporting vehicle or to a medical facility. Currently there are two litter designs that are predominately in use: a STOKES™ litter and a SKED™ litter. The STOKES™ litter is typically transported by at least two persons carrying a single victim. However, in some environmental situations multiple persons may be required to carry the litter, depending on the weight of the patient or the terrain being traversed. Additionally, standard ambulance gurneys or wheeled litter designs have a height ranging from 2 to 3 feet, which results in more physical demands and stress being placed on rescue personnel. The SKED™ transports single victims by dragging them on the ground, which is often not the optimal transportation method.

The instant application solves many of the problems inherent in the prior art litters by utilizing a four-wheeled rescue litter (FWRL) that utilizes a pair of front pneumatic tires and a pair of rear tires. The front tires allow the FWRL to be easily steered over various terrains. The rear tires aid in stabilizing the FWRL when the FWRL is being steered. Additionally, only one person is required to operate the FWRL when transporting an injured person.

A search of the prior art did not disclose any literature or patents that read directly on the claims of the instant invention.

However, the following U.S. patents are considered related:

| PAT. NO. | INVENTOR | ISSUED |
| --- | --- | --- |
| 7,150,465 | Darling | 19 Dec. 2006 |
| 7,131,666 | Jenney | 7 Nov. 2006 |
| 6,698,811 | Schuchman | 2 Mar. 2004 |

The U.S. Pat. No. 7,150,465 discloses a multi-purpose, collapsible portable cart/utility table, for use in emergency response and disaster situations. The table can be converted for various uses and can be folded and transported. The table transports injured persons or cargo over long, rough terrain and can be dissembled into a carrying position.

The U.S. Pat. No. 7,131,666 discloses a trailer for all terrain vehicles and/or snowmobiles for transporting injured persons from remote locations. The trailer has a frame, a main axle, a spring and shock suspension, flotation type tires, IV pole with multiple mounting locations, a carrier area for transporting injured personnel, and an accessory device for attaching miscellaneous accessories.

The U.S. Pat. No. 6,698,811 discloses a litter for transporting an injured person. The litter includes a frame extending transversely of the litter between a pair of poles at one end of the litter. A pair of collars are attached to the frame and are dimensioned to fit over ends of the poles for mounting an attachment to the litter. Wheels allowed to the frame extend beneath the litter so when the attachment is mounted in place, the litter is movable over a surface by only one attendant. A support extends upward from the frame above an upper surface of the litter. Thus, when the attendant lifts the end of the litter opposite that on which the attachment is mounted, the person placed on the litter is supported and will not fall off the litter.

For background purposes and indicative of the art to which the invention relates, reference may be made to the following remaining patents found in the patent search.

| PAT. NO. | INVENTOR | ISSUED |
| --- | --- | --- |
| 820,026 | Stokes | 8 May 1906 |
| 1,109,083 | Saltis | 1 Sep. 1914 |
| 4,953,886 | Grant | 4 Sep. 1990 |
| 5,398,358 | Mereke et al. | 21 Mar. 1995 |
| 6,824,150 | Simione | 30 Nov. 2004 |
| 7,044,496 | Hoinies | 16 May 2006 |
| 7,210,697 | Simpson | 1 May 2007 |
| 2003/0150059 | Sawatzky | Pub. Date: Aug, 14, 2003 |
| 2012/0000718 | Berrett et al | Pub. Date: Jan. 5, 2012 |
| WO2010/128498 | Bar Noy | 27 Apr. 2010 |

DISCLOSURE OF THE INVENTION

The four-wheeled rescue litter (FWRL) provides a first responder, such as emergency response teams, firefighters, paramedics or law enforcement with a litter that can be operated by a single person to transport an injured individual or equipment. The FWRL utilizes sets of front and rear wheels that allow the FWRL to be deployed in various types of terrains or remote locations. In its basic design configuration the FWRL, which is also known as the COBRA™, is comprised of:

An elongated upper rail having a right side rail and a left side rail, wherein each rail end is respectively attached to a front upper tri-angled rail and a rear upper tri-angled rail, An elongated lower rail having a right side rail and a left side rail that are attached at each end respectively to a front lower tri-angled rail and a rear lower tri-angled rail, A plurality of posts that vertically separate the elongated upper rail from the elongated lower rail, A litter base having means for being attached to the elongated lower rail, A handle that is attached to a right post and a left post which are swivelly connected to a pair of yokes that are respectively attached to the right side rail and the left side rail of the elongated upper rail, A pair of front swivel wheels that are attached at the front end to the elongated lower rail, and a pair of fixed rear wheels that are attached at the rear end to the elongated lower rail. Both the front wheels and the rear wheels can swivel or if desired, only the front wheels on the rear wheels can swivel. The choice of which wheels swivel depends on the use and/or requirements of the FWRL. Both sets of wheels can be detachable in two pieces from the FWRL. And the wheels can also be detachable from each of their respective axle assembly. In order to provide maximum performance, the bearing within each wheel is located within a housing made of machined aluminum, which is significantly more durable than a housing made of other materials, such as plastic.

The vertical spacing of the elongated upper rail and the elongated lower rail provide a margin of safety that prevents an injured individual placed on the litter base from inadvertently falling off the sides of the FWRL. This type of incident is particularly possible when the FWRL is being transported over unstable terrain. Also, the length and width of the FWRL is dimensional to accommodate persons of various statures.

The litter base is primarily designed to be permanently attached by means of screws to the lower rails. However, the litter base can be easily detached by removing the screws. The removable feature allows the litter base to be removed for cleaning or to replace a worn-out or damaged litter base.

A detachable tow bar can also be included. The tow bar has a back hitch and is used in combination with a conventional one and seven-eighths inch ball hitch mount to allow the FWRL to be pulled by other motorized or non-motorized vehicles. When the tow bar is not in use, it can be folded below the litter. The tow bar is located at the front of the FWRL but additionally, a detachable ball hitch can be located at the rear of the FWRL. The rear ball hitch facilitates the use of multiple simultaneous FWRLS that are connected together.

In view of the above disclosure, the primary object of the invention is to produce a FWRL that can be pulled or pushed by a single individual to safely transport an injured person over various types of terrain, or remote locations.

In addition to the primary object of the invention it is also an object of the invention to produce an invention that:
- can be made in various sizes,
- minimizes rescuer fatigue and back injuries from transporting victims,
- can be used to transport adults, children or animals,
- significantly increases the capability of rescue personnel,
- can be attached to an All Terrain Vehicle (ATV) or a Gator vehicle,
- by using a four-point litter sling, the FWRL can be attached to a helicopter rescue line,
- by using all-terrain pneumatic tires, the FWRL provides comfort and safety for the individual being carried.
- is lightweight and easily maneuverable,
- is robust,
- can also be used to move or transport various types of equipment, and
- is cost effective from both a manufacturer's and consumer's point of view.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 2 is a top plan view of the FWRL.

FIG. 3 is a bottom plan view of the FWRL.

FIG. 7 is a rear elevational view of the FWRL's front structure.

FIG. 8 is a right side view of the FWRL's front structure including a front vehicle interface assembly.

FIG. 11 is an orthographic view showing two FWRLS attached together by the front vehicle interface assembly on the second FWRL attached to a ball hitch mount on the rear of the first FWRL.

BEST MODE FOR CARRYING OUT THE INVENTION

Figure 1:
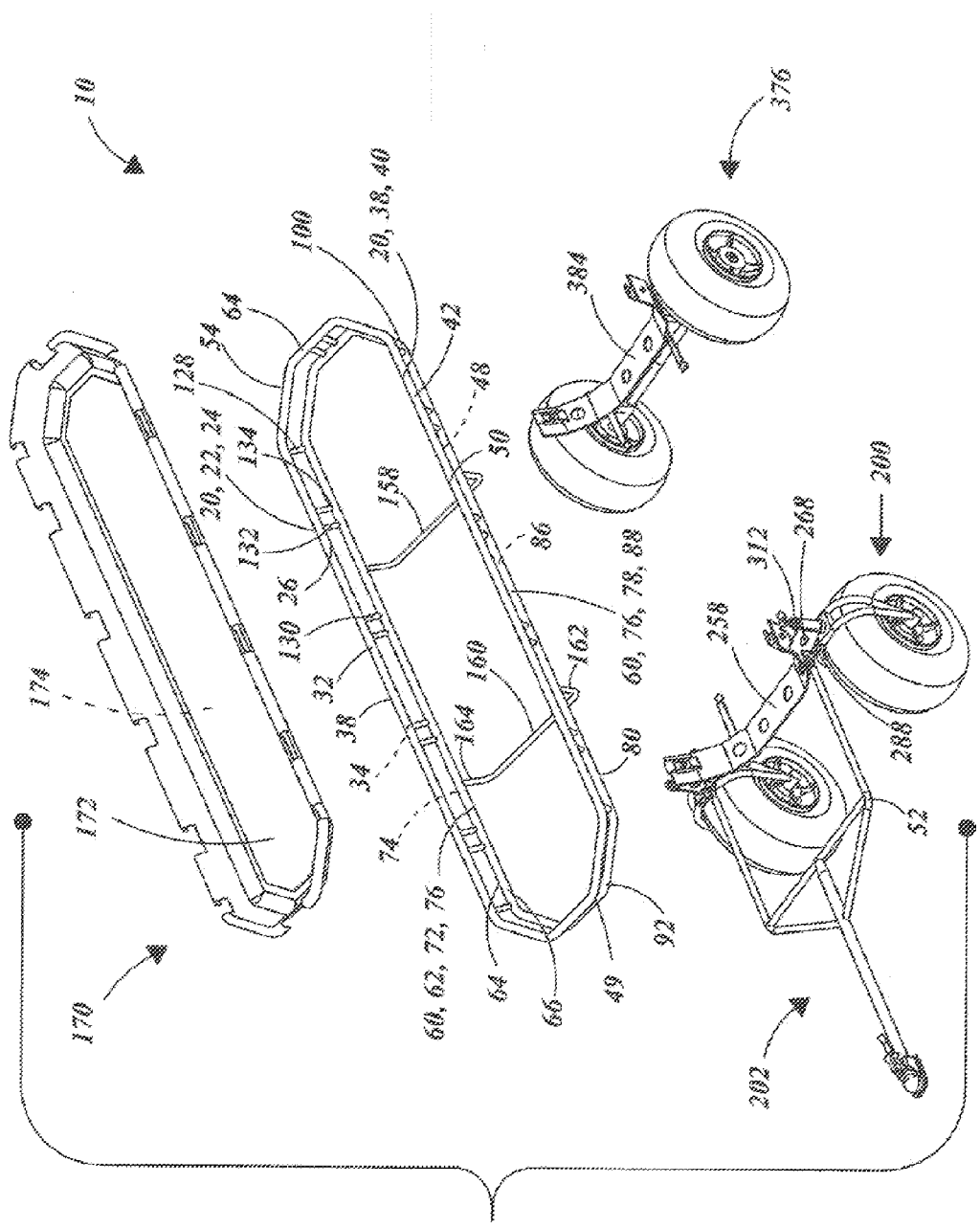
FIG. 1 is an orthographic exploded view of a four wheel rescue litter (FWRL).

The best mode for carrying out the invention is presented in terms that disclose a preferred embodiment of a four-wheeled rescue litter (FWRL) that is designed to allow a single person to safely transport an injured individual over various types of terrain.

The preferred embodiment of the FWRL 10, as shown in FIGS. 1-11, is comprised of the following major elements: an elongated upper rail 20, an elongated lower rail 60, a plurality of vertical posts 128, a handle yoke 146, a handle 150, a plurality of litter base supports 158, a litter base 170, a front structure 200 and a rear structure 376.

The FWRL 10, as shown in FIGS. 1-11, has a front end 12, a rear end 14, a right side 16, and a left side 18. Extending from the front end 12 and the rear end 14 are the elongated upper rail 20 and the elongated lower rail 60 which are dimensioned to accommodate the stature of most individuals.

Figure 4:
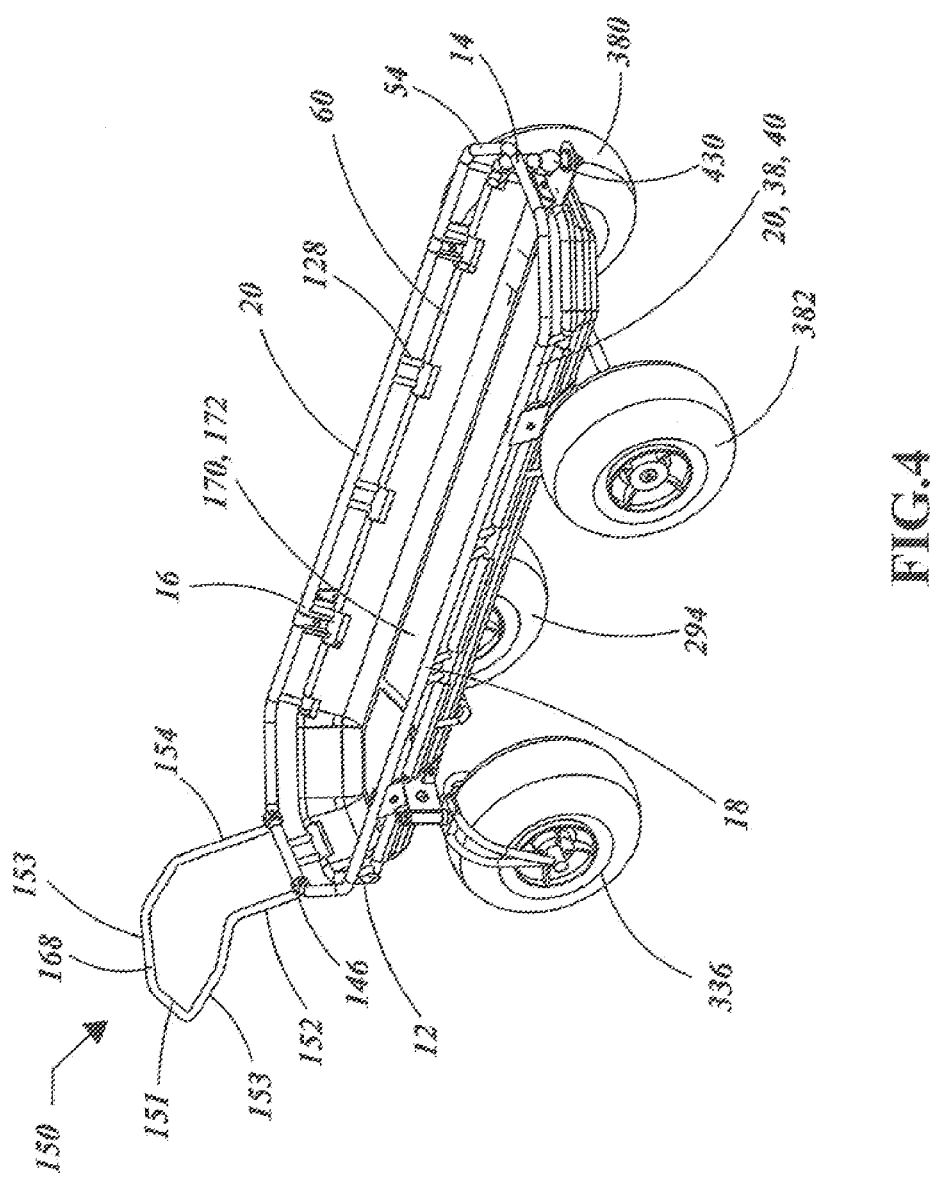
FIG. 4 is an orthographic view of the FWRL with a front handle and a rear ball hitch mount.

The elongated upper rail 20, as shown in FIGS. 1 and 4, is comprised of a right side rail 22, a left side rail 38, a front upper tri-angled rail 49, and a rear upper tri-angled rail 54. The right side rail 22 has an upper surface 24, a lower surface 26, an inner surface 32 and an outer surface 34. The left side rail 38 has similar dimensions as the right side rail 22 and includes an upper surface 40, a lower surface 42, an inner surface 48 and an outer surface 50.

The front upper tri-angled rail 49, as also shown in FIG. 1, is attached by welding 52 to the right side rail 22. Likewise, the front upper tri-angled rail 49 is attached by welding to the left side rail 38. A rear upper tri-angled rail 54 is attached by welding to the right side rail 22, and the rear upper tri-angled rail 54 is attached by welding to the left side rail 38.

The elongated lower rail 60, as shown in FIG. 1, can be similarity dimensioned and be substantially concentric with the elongated upper rail 20. The lower rail 60 can also be designed with smaller overall dimensions to allow an inward angle to be produced that extends from the upper rail 20 to the lower rail 60. The elongated lower rail 60 is also comprised of a right side rail 62, a left side rail 76, a front lower tri-angled rail 92 and a rear lower tri-angled rail 100. The right side rail 62 has an upper surface 64, a lower surface 66, an inner surface 72 and an outer surface 74.

The front lower tri-angled rail 92, as shown in FIG. 1, is attached by welding to the right side rail 62. The left side rail 76 also has an upper surface 78, a lower surface 80, an inner surface 86 and an outer surface 88. The rear lower tri-angled rail 100 is attached by welding to the right side rail 62. The curved rail 100 is attached by welding to the left side rail 76. The front and rear rails can be designed to have a segmented curve, as shown in FIGS. 1-4, or can be radiused.

The elongated upper rail 20 is vertically separated from the elongated lower rail 60, as best shown in FIG. 1, by the plurality of vertical posts 128 that preferably consist of side-by-side paired posts 130 that are spaced around the perimeter of the upper rail 20 and the lower rail 60. Each post 128 has an upper end 132 that is attached by welding 52 to the lower surface 26 of the upper rail 20 and a lower end that is attached by welding 52 to the upper surface 64 of the lower rail 60.

The upper rail 20 and the lower rail 60 are made of a solid or tubing that is selected from the group consisting of steel or steel alloy, stainless steel, titanium, aluminum, brass and copper. If aluminum is used it can be anodized in selectable colors. The diameter of all the rails ranges from 0.50 to 1.50 inches (1.27 to 3.81 cm). Additionally, to allow the FWRL 10 to be dismantled, the upper and lower rails can be comprised of a plurality of individual sections that are attached by means of a sleeve which is secured to the rails by a set of screws. Also, the right and upper tri-angled rails 49,54 and 92,100 can have a radius 112, or have a straight horizontal section 151 having an angled section 153.

The litter base 170, as shown in FIGS. 1-4, has an upper surface 172, a lower surface 174 and a perimeter that substantially follows the perimeter of the lower rail 60. The lower surface 174 of the litter base 170 interfaces with the plurality of litter base supports 158. The supports 158, as shown in FIG. 1, have a U-shape with a center section 160 that extends laterally and terminates with a right upward-extending section 162 and a left upward-extending section 164, each having ends that are attached by welding 52 respectively to the lower surface 66 of the right side rail 62 and the left side rail 76 of the lower rail 60.

Figure 10:
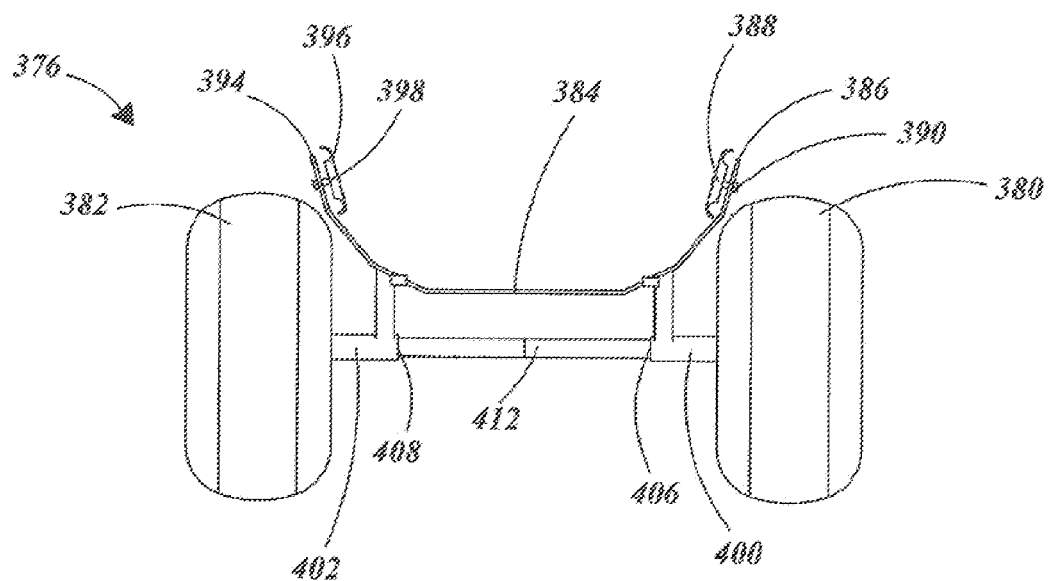
FIG. 10 is a rear elevational view of the FWRL's rear structure.

The litter base 170 is designed with a means 175 for attaching the litter base 170 to the lower rail 60. The means include a litter base that terminates with an attachment hook. The hook is dimensioned to fit over the upper surface 64 of the right side rail 62 and the upper surface 78 of the left side rail 76, as shown in FIG. 10. To secure the litter base 170, a screw is inserted through the attachment hook and into the lower rail 60.

The FWRL 10 is moved by means of a handle 150 that is attached to a pair of yokes 146. Each yoke has a lower surface 148 and is attached by welding 52 to the upper surface 24 of the elongated upper rail 20 and the upper surface 64 of the lower rail 60. The yokes 146 are aligned with the vertical post nearest the front end 12 of the FWRL 10. The handle 150 is integrally attached to a right post 152 and a left post 154. Each post has a lower end 156 that is rotatably attached to the respective handle yoke 146 extending from the upper rail 20. When the handle 150 is not in use, it can be rotated so that the handle grip is secured to a clip attached to the upper rail 20.

The handle 150 can be radiused or the handle 150 can be configured, as shown in FIG. 4, with a horizontal center section 151 that integrally terminates on each side with an angled section 153. The sections 153 are ergonomically positioned to allow the handle 150 to be comfortably grasped when pulling or pushing the FWRL 10. Optionally, the handle 140 can include a resilient handle grip 168, as shown in FIG. 4, that is inserted over the two angled sections 153.

Figure 5:
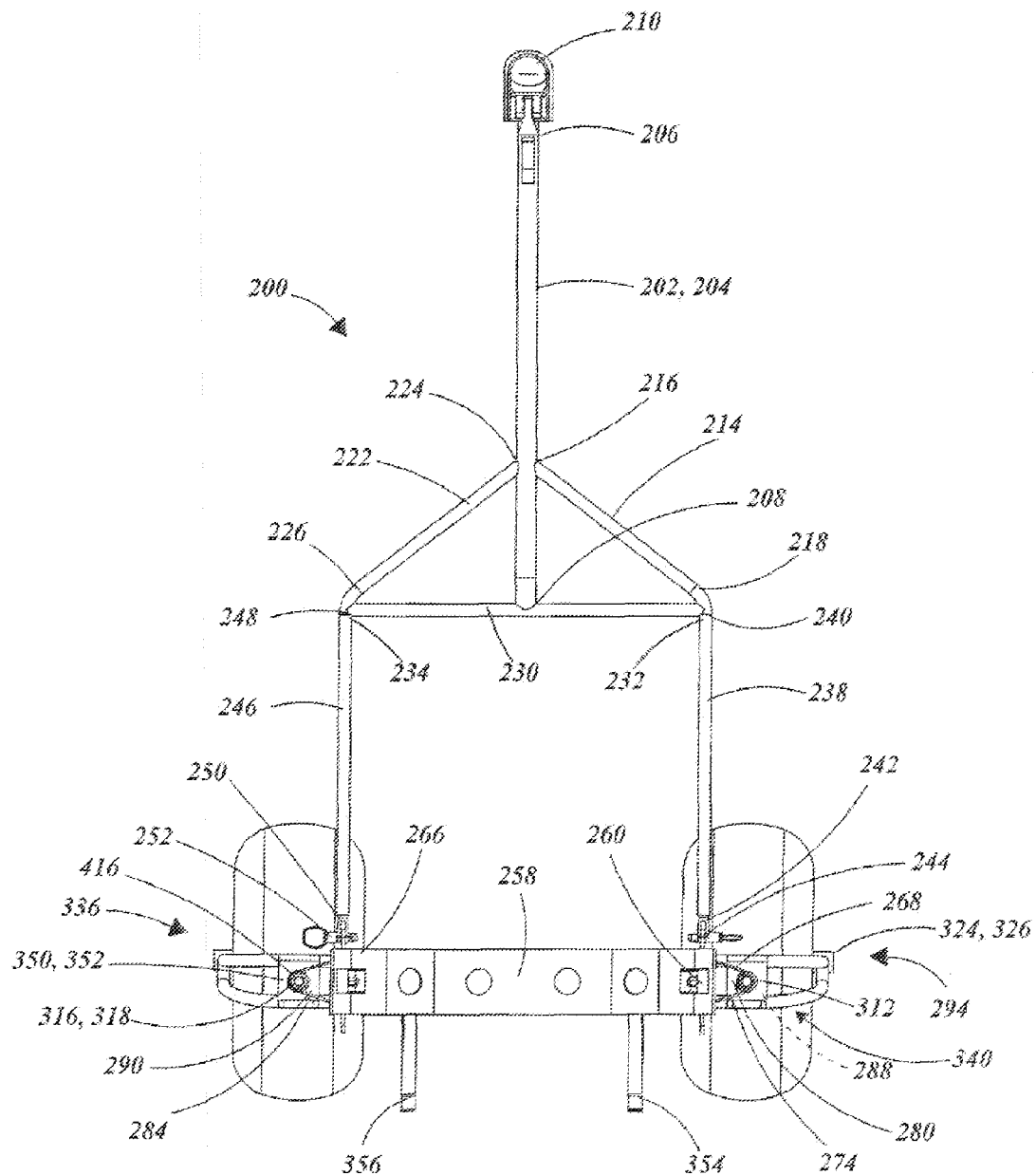
FIG. 5 is a top plan view of the FWRL's front structure including a front vehicle interface assembly.
Figure 6:
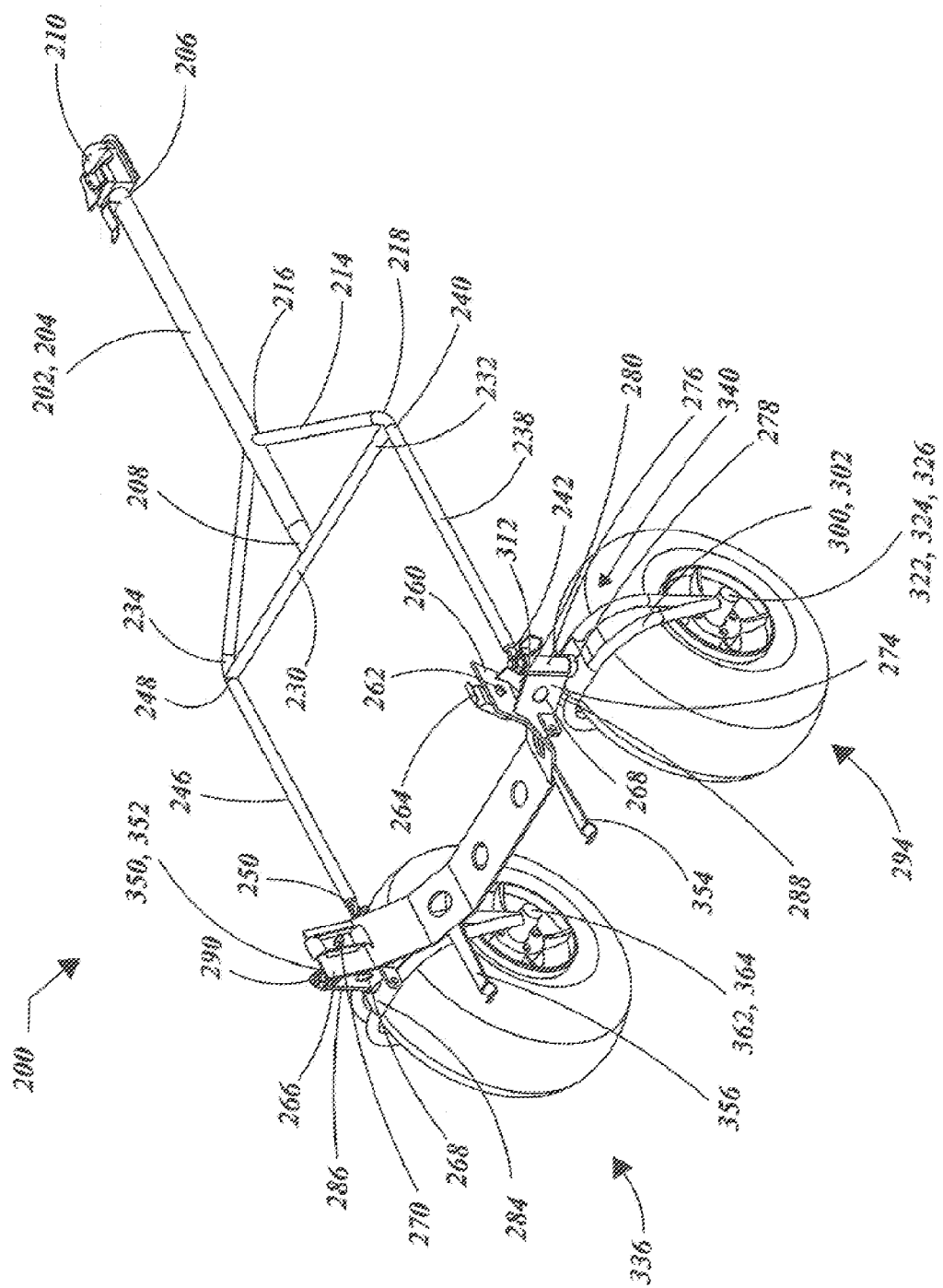
FIG. 6 is an orthographic view of the FWRL's front structure including a front vehicle interface assembly.
Figure 9:
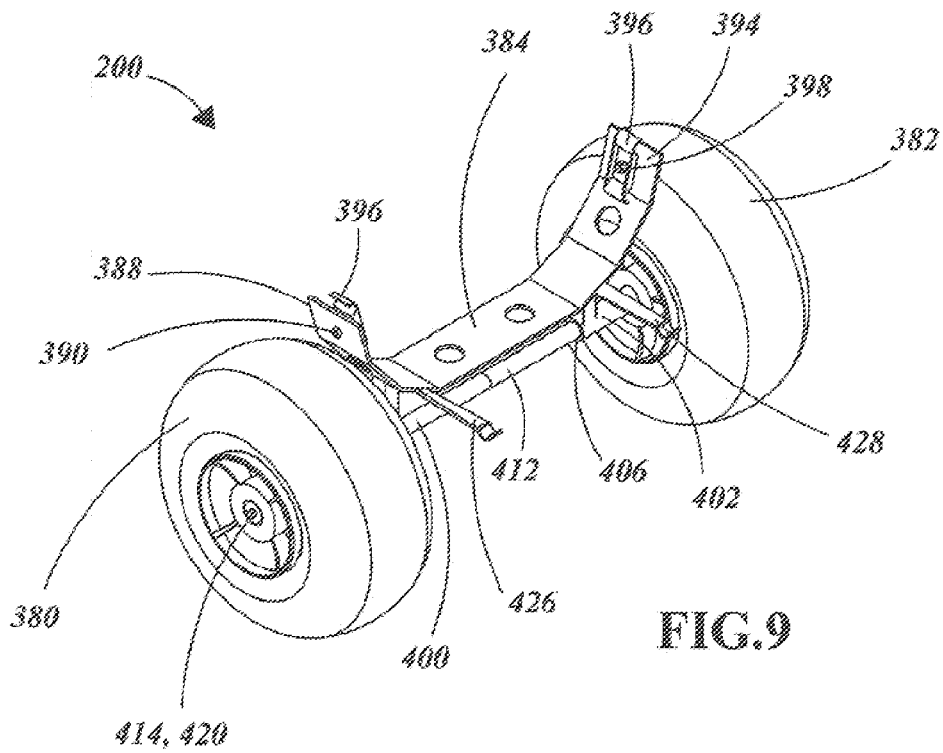
FIG. 9 is an orthographic view of the FWRL's rear structure.

The front structure 200, as shown in FIGS. 1, 2, 3, 5-8, is comprised of:

1. a front vehicle interface assembly 202 comprising:
    a) a longitudinal member 204 having a first end 206 and a second end 208. Attached to the first end 206 is a ball hitch 210 for securing the FWRL 10 to a vehicle by utilizing the vehicle's ball hitch mount, a ball hitch mount 430 can also be located at the rear end 14 of the FWRL 10. The rear ball hitch mount 430 facilitate two FWRLS being attached together by the front vehicle interlace assembly on the second FWRL attached to the ball hitch mount on the rear of the first FWRL, as shown in FIG. 11,
    b) a right angular strut 214 having a first end 216 and a second end 218. The first end 216 is attached to, and extends angularly outward from, the longitudinal member 204,
    c) a left angular strut 222 having a first end 224 and a second end 226. The first end 224 is attached to, and extends angularly outward from, the longitudinal member 204,
    d) a lateral strut 230 having a right first end 232 and a left second end 234. The right first end 232 is attached to the second end 218 of the right angular strut 214, and the left second end 234 is attached to the second end 226 of the left angular strut 222, thereby creating a triangle shaped assembly consisting of the right angular strut 214, the left angular strut 222 and the lateral strut 230, with the longitudinal member 204 extending from the substantial center of the lateral strut 230 and through the apex of the triangle,
    e) a right vertical strut 238, as shown in FIGS. 5, 6 and 8, having a first end 240 and a bifurcated second end 242 having a bore 244 through each of the bifurcated sections. The first end 240 is attached to the right first end 232 of the lateral strut 230, and the bifurcated second end 242 interfaces with a tab that extends from the front lower tri-angled rail 92 or the front upper tri-angled rail 49. The tab's bore is aligned with the bifurcated second end's bore 244 when the tab is inserted between the two bifurcated sections. An attachment means is inserted through the three aligned bores and is secured thereto, The attachments means can be comprised of a nut and bolt combination, a screw, a cotter pin or other similar device,
    f) a left vertical strut 246, as shown in FIGS. 5 and 6, having a first end 248 and a bifurcated second end 250 having a bore 252 through each of the bifurcated sections. The first end 248 is attached to the left second end 23 of the lateral strut 230, and the bifurcated second end 250 interfaces with a tab that extends from the front lower tri-angled rail 92 or the front upper tri-angled rail. The tab's bore is aligned with the bifurcated second end's bore 252 when the tab is inserted between the two bifurcated sections. An attachment means is inserted through the three aligned bores and is secured thereto. Once the attachment means is secured to both the right and left vertical struts, the front vehicle interface assembly 202 is secured to the FWRL 10. The two attachment means function as axles on which said front vehicle interface assembly can pivot up and down. Preferably, the attachment means are comprised of a bolt, a screw, a rod, a pin or any similar device that facilitates the pivoting action,
    g) a front wheel support member 258, as shown in FIGS. 1, 5 and 6, with a right first end 260 that curves upward and having a bore 262 therethrough and a right frame interface 264, and a left second end 266 that curves upward and having a bore 268 therethrough and a left frame interface 270. Extending outward from the right first end 260 is a right v-shaped wheel assembly bolt 274 interface having a right vertical wheel bolt attachment tube 276 with a lower opening 278 and an upper opening 280. Extending outward from the left second end 266 is a left V-shaped wheel assembly bolt 284 interface having a left vertical wheel bolt attachment tube 286 with a lower opening 288 and an upper opening 290. The right and left frame interfaces provide the means by which the front structure 200 is secured at the front end 12 of the FWRL 10 by use of an attachment means,
    h) a right wheel/tire assembly 294, as shown in FIGS. 5, 6, 7 and 8, comprising a wheel support structure 298 with a right first curved support member having two parallel struts that curve downward and interface, and a right second curved support member 300 having two parallel struts 302 that curve downward and interface. Located at the top of the right wheel support structure 298 where the two support members meet is a right upper bolt plate 310 with a bore 312 therethrough, and a first axle 330 interface. A threaded bolt 316 is inserted upward through the bore 312 on the upper bolt plate 310 and into the lower opening 278 of the right vertical wheel bolt attachment tube and through the right vertical wheel bolt attachment tube 276. A nut is then secured onto the threaded end of the bolt 306 extending from the upper opening 280 of the vertical wheel bolt attachment tube 276. When secured, the bolt 306 functions as an axle that allows the right wheel/tire assembly 294 to swivel in a left and right direction. The right wheel/tire assembly 294 is secured by inserting a rod 324 that functions as an axle through a right center axle bore 322 located at the substantial center of the wheel. The rod 324 has a first end 326 that is inserted into a first axle 330 interface located where the right first and second curved support members interface on the right side, and a second end 328 that is inserted into a second axle 332 interface located where the right first and second curved support members interface on the left side. Once the right wheel/tire assembly 294 is secured, the right wheel/tire can freely rotate on the axle, i) a left wheel/tire assembly 336, as shown in FIGS. 5, 6 and 7, comprising a wheel support structure 340 with a left first curved support member 342 having two parallel struts 344 that curve downward and interface and a left second curved support member 346 having two parallel struts 348 that curve downward and interface. Located at the top of the left wheel support structure 340 where the two support members meet is a left upper bolt plate 350 with a bore 352 therethrough, and a first axle interface 372. A threaded bolt 356 is inserted upward through the bore 352 on the upper bolt plate 350 and into the lower opening of the left vertical wheel bolt attachment tube and through the left vertical wheel bolt attachment tube 286. A nut is then secured onto the threaded end of the bolt 350 extending from the upper opening 290 of the left vertical wheel bolt attachment tube 286. When secured, the bolt 350 functions as an axle that allows the left wheel/tire assembly 336 to swivel in a left and right direction. The left wheel/tire assembly 336 is secured by inserting a rod 364 that functions as an axle through a left center axle bore 362 located at the substantial center of the wheel. The rod 364 has a first end 368 that is inserted into a first axle 372 interface located where the right first and second curved support members interface on the right side, and a second end 370 that is inserted into a second axle 374 interface located where the left first and second curved support members interface on the left side. Once the left wheel/tire assembly 336 is secured, the left wheel/tire can freely rotate on the axle, j) a rear structure 376, as shown in FIGS. 1, 9 and 10, comprising:
  a) a rear wheel support member 384 with a right first end 386 that curves upward and having a bore 390 therethrough, and a left second end 394 that curves upward and having a bore 398 therethrough. Located on the right first end 386 is a right frame interface 388 and located on the left second end 394 is a left frame interface 396. The two frame interfaces facilitate the attachment of the rear structure 376 at the rear end 14 of the FWRL 10. Extending inward from adjacent the right first end 386 is a right rear frame attachment member 426 and extending inward from adjacent the left second end 394 is a left rear frame attachment member 428. The extended ends of the two frame attachment members are curved to dimensionally encompass the round shape of one section of the FWRL's frame. The frame attachment members facilitate the attachment of the rear structure 376 at the rear end 14 of the FWRL,
  b) a right L-shaped wheel/tire attachment structure 400, as shown in FIGS. 9 and 10, that extends downward from and is attached adjacent the right first end 386 of the rear wheel support member 384. A right end section of the lower L-shape is attached to the right wheel/tire assembly 380 and a left end of the lower L-shape has a right axle opening 406, and
  c) a left L-shaped wheel/tire attachment structure 402, as shown in FIGS. 9 and 10, that extends downward from and is attached adjacent the left second end 394 of the rear wheel support member 384. A left end section of the lower L-shape is attached to the left wheel/tire assembly 382, and a right end of the lower L-shape has a left axle opening 408. A first end of a rod 412 that functions as an axle is inserted into the right axle opening 406 on the left end of the right L-shaped wheel/tire attachment structure and a second end of the rod is inserted into the left axle opening 408 on the right end of the left L-shaped wheel/tire assembly, thereby creating an axle upon which the two wheel/tire assemblies can rotate. Located at the substantial center on an outer surface of the right wheel/tire assembly 380 is a right bore 414 and located at the substantial center on an outer surface of the left wheel/tire assembly 382 is a left bore 416. A right axle bolt 420 is inserted into a secured within the right bore 414 and a left axle bolt 422 is inserted into and secured within the left bore 416, thereby securing both wheel/tire assemblies to the rear structure 376.

It should be noted that the preferred embodiment of the FWRL 10 utilizes front wheels/tires that swivel and stationary, non-swiveling rear wheels/tires. Other embodiments can also be utilized, for example, both the front and rear wheels/tires can swivel, or both the front and rear wheels/tires can be stationary, non-swiveling.

While the invention has been described in detail and pictorially shown in the accompanying drawings it is not to be limited to such details, since many changes and modification may be made to the invention without departing from the spirit and the scope thereof. Hence, it is described to cover any and all modifications and forms which may come within the language and scope of the claims.

The invention claimed is:

1. A four-wheeled rescue litter (FWRL) comprising:
  a) an elongated upper rail having a right side rail and a left side rail that are attached at each end respectively to a front upper tri-angled rail and a upper tri-angled rail,
  b) an elongated lower rail having a right side rail and a left side rail that are attached at each end respectively to a front upper tri-angled rail and a upper tri-angled rail,
  c) a plurality of posts that vertically separate said elongated upper rail from said elongated lower rail,
  d) a litter base having means for being attached to said elongated lower rail,
  e) a handle having a right post and a left post that are swivelly connected to a pair of yokes which are respectively attached to the right side rail and the left side rail of said elongated upper rail, f) a pair of front swivel wheels that are attached by front wheel attachment means to the right side rail and the left side rail of said elongated lower rail, and g) a pair of rear wheels that are attached by rear wheel attachment means to the right side rail and the left side rail of said elongated lower rail.

2. A four-wheeled rescue litter (FWRL) comprising:

A. a front end, a rear end, a right side and a left side,

B. an elongated upper rail comprising:
  a) right side rail having an upper surface, a lower surface, an inner surface and an outer surface,
  b) a left side rail having an upper surface, a lower surface, an inner surface and an outer surface,
  c) a front upper tri-angled rail comprising:
    (1) a right edge that is attached by welding to the front edge of the right side-rail, and
    (2) a left edge that is attached by welding to the front edge of the left side-rail,
  and an upper tri-angled rail comprising an elongated lower rail that is substantially concentric with said elongated upper rail, said elongated lower rail comprising:
    a) a right side rail having an upper surface, a lower surface, an inner surface and an outer surface,
    b) a left side rail having an upper surface, a lower surface, an inner surface and, an outer surface,
    c) a front upper tri-angled rail comprising:
      (1) a right edge that is attached by welding, to the front edge of the right side-rail, and
      (2) a left edge that is attached by welding to the front edge of the left side-rail,
    d) a upper tri-angled rail comprising a plurality of vertical posts that separate said upper rail from said lower rail and that are spaced around the perimeter of said upper rail and said lower rail, wherein each post has an upper end that is attached by welding to the lower surface of said upper rail and a lower end that is attached by welding to the upper surface of said lower rail, E. a litter base having an upper surface, a lower surface and a perimeter that substantially follows the perimeter of said lower rail, wherein the lower surface of said litter plate interfaces with the plurality of litter base supports, wherein said litter base is designed with means for attaching said litter base to said lower rail, F. a handle yoke having a lower surface attached by welding to the upper surface of the elongated upper rail, in alignment with the vertical post nearest the front end of said FWRL, G. a handle attached to a right post and a left post, each having a lower end that is swivelly attached to the respective handle yoke extending from the upper rail, H. a plurality of litter base supports having a U-shape with a center section that extends laterally and that terminates with a right upward-extending section and a left upward-extending section each having ends that are attached by welding respectively to the lower surface of said right side rail and said left side rails, I. a front structure comprising:
  1. a front vehicle interface assembly comprising:
    a) a longitudinal member having a first end and a second end, wherein attached to the first end is a ball hitch for securing said FWRL to a vehicle by utilizing the vehicle's ball hitch mount,
    b) a right angular strut having a first end and a second end, wherein the first end is attached to, and extends angularly outward from, said longitudinal member,
    c) a left angular strut having a first end and a second end, wherein the first end is attached to, and extends angularly outward from, said longitudinal member,
    d) a lateral strut having a right end and a left end, wherein the right first end is attached to the second end of the right angular strut, and the left second end is attached to the second end of the left angular strut, thereby creating a triangle shaped assembly consisting of the right angular strut, the left angular strut and the lateral strut, with the longitudinal member extending from the substantial center of the lateral strut and through the apex of the triangle,
    e) a right vertical strut having a first end and a bifurcated second end having a bore through each of the bifurcated sections, wherein the first end is attached to the right first end of the lateral strut, wherein the bifurcated second end interfaces with a tab that extends from the front lower tri-angled rail or the front upper tri-angled rail, wherein the tab's bore is aligned with the bifurcated second end's bore when the tab is inserted between the two bifurcated sections, wherein an attachment means is inserted through the three aligned bores and is secured thereto,
    f) a left vertical strut having a first end and a bifurcated second end having a bore through each of the bifurcated sections, wherein the first end is attached to the left second end of the lateral strut, wherein the bifurcated second end interfaces with a tab that extends from the front lower tri-angled rail or the front upper tri-angled rail, wherein the tab's bore is aligned with the bifurcated second end's bore when the tab is inserted between the two bifurcated sections, wherein an attachment means is inserted through the three aligned bores and is secured thereto, wherein once the attachment means is secured to both the right and left vertical struts said front vehicle interface assembly is secured to aid FWRL wherein the two attachment means function as axles on which said front vehicle interface assembly can pivot up and down,
    g) a front wheel support member with a right first end that curves upward and having a bore therethrough and a right frame interface, and a left second end that curves upward and having a bore therethrough and a left frame interface, wherein extending outward from the right first end is a right v-shaped wheel assembly bolt interface having a right vertical wheel bolt attachment tube with a lower opening and an upper opening, any extending outward from the left second end is a left V-shaped wheel assembly bolt interface having a left vertical wheel bolt attachment tube with a lower opening and an upper opening, wherein the right and left frame interfaces provide the means by which said front structure is secured to said FWRL by use of an attachment means, wherein extending inward from adjacent the right first end is a right rear frame attachment member, and extending inward from adjacent the left second end is a left rear frame attachment member, wherein the extended ends of the two frame attachment members are curved to dimensionally encompass the round shape of one section of the FWRL's frame, wherein the frame attachment members facilitate the attachment of the rear structure at the rear end of the FWRL, h) a right wheel/tire assembly comprising a wheel support structure with a right first curved support member having two parallel struts that curve downward and interface, and a right second curved support member having two parallel struts that curve downward and interface, wherein located at the top of the right wheel support structure where the two support members meet is a right upper bolt plate with a bore therethrough, and a right axle interface, wherein a threaded bolt is inserted upward through the bore on the upper bolt plate and into the lower opening of the vertical wheel bolt attachment tube and through the right vertical wheel bolt attachment tube, wherein a nut is secured onto the threaded end of the bolt extending from the upper opening of the vertical wheel bolt attachment tube, wherein when secured, the bolt functions as an axle that allows the right wheel/tire assembly to swivel in a left and right direction, wherein a right wheel/tire is secured to the right wheel/tire assembly by inserting a rod that functions as an axle through a right center axle bore located at the substantial center of the wheel, wherein the rod has a first end that is inserted into a right axle interface located where the right first and second curved support members interface on the right side, and a second end that is inserted into a second axle interface located where the right first and second curved support members interface on the left side, wherein once the wheel/tire assembly is secured, the wheel/tire can freely rotate on the axle, i) a left wheel/tire assembly comprising a wheel support structure with a left first curved support member, having two parallel struts that curve downward and interface and a left second curved support member having two parallel struts that curve downward and interface, wherein located at the top of the left wheel support structure where the two support members meet is a left upper bolt plate with a bore therethrough, and a right axle interface, wherein a threaded bolt is inserted upward through the bore on the upper bolt plate and into the lower opening of the vertical wheel bolt attachment tube and through the right vertical wheel bolt attachment tube, wherein a nut is secured onto the threaded end of the bolt extending from the upper opening of the vertical wheel bolt attachment tube, wherein when secured, the bolt functions as an axle that allows the right wheel/tire assembly to swivel in a left and right direction, wherein a right wheel/tire is secured to the right wheel/tire assembly by inserting a rod that functions as an axle through a left center axle bore located at the substantial center of the wheel, wherein the rod has a first end that is inserted into a first axle interface located where the right first and second curved support members interface on the right side, and a second end that is inserted into a second axle interface located where the right first and second curved support members interface on the left side, wherein once the wheel/tire assembly is secured, the wheel/tire can freely rotate on the axle, j) a rear structure comprising:
 a) a rear wheel support member with a right first end that curves upward and having a bore therethrough, and a left second end that curves upward and having a bore therethrough, wherein located on the right first end is a right frame interface and located on the left second end is a left frame interface, wherein the two frame interfaces facilitate the attachment of said rear structure at the rear end of the FWRL, wherein extending inward from adjacent the right first end is a right rear frame attachment member and extending inward from adjacent the left second end is a left rear frame attachment member, wherein the extended ends of the two frame attachment members are curved to dimensionally encompass the round shape of one section of the FWRL's frame, wherein the frame attachment members facilitate the attachment of the rear structure at the rear end of the FWRL,
 b) a right L-shaped wheel/tire attachment structure that extends downward from and is attached adjacent the right first end of the rear wheel support member, wherein a right end section of the lower L-shape is attached to the right wheel/tire assembly and a left end of the lower L-shape having a right axle opening, and
 c) a left L-shaped wheel/tire attachment structure that extends downward from and is attached adjacent the left second end of the rear wheel/tire support member, wherein a left end section of the lower L-shape is attached to the left wheel/tire assembly, and a right end of the lower L-shape having a left axle opening, wherein a first end of a rod that functions as an axle is inserted into the right axle opening on the left end of the right L-shaped wheel/tire attachment structure and a second end of the rod is inserted into the left axle opening on the right end of the left L-shaped wheel/tire assembly, thereby creating an axle upon which the tow wheel/tire assemblies can rotate, wherein located at the substantial center on an outer surface of the right wheel/tire assembly is a right bore and located at the substantial center on an outer surface of the left wheel/tire assembly is a left bore, wherein a right axle bolt is inserted into an secured within the right bore and a left axle bolt is inserted into and secured within the left bore, thereby securing both wheel/tire assemblies to the rear structure.

3. The FWRL as specified in claim 2 wherein said rear structure further comprises a ball hitch mount that facilitates the attachment of a second rear FWRL to a first front FWRL.

4. The FWRL as specified in claim 2 wherein said elongated upper rail and said lower rail are comprised of a solid material selected from the group consisting of steel, steel alloy, stainless steel, titanium, aluminum, brass and copper.

5. The FWRL as specified in claim 2 wherein said upper rails and said lower rails are comprised of a tubing material selected from the group consisting of steel, steel alloy, stainless steel, titanium, aluminum, brass and copper.

6. The FWRL as specified in claim 2 wherein said rails have a diameter that ranges from 0.50 to 1.50 inches (1.27 to 3.81 cm).

7. The FWRL as specified in claim 2 wherein said front and upper tri-angled rails are radiused.

8. The FWRL as specified in claim 2 wherein said front and upper tri-angled rails have a straight horizontal section having curved ends.

9. The FWRL as specified in claim 2 wherein said vertical posts are further comprised of side-by-side paired posts.

10. The FWRL as specified in claim 2 wherein said handle is radiused.

11. The FWRL as specified in claim 2 wherein said handle is configured with a horizontal center section that integrally terminates at each side with an angled section, wherein the angled sections are ergonomically positioned to allow the handle to be comfortably grasped when pulling or pushing said FWRL.

12. The FWRL as specified in claim 10 further comprising a resilient handle grip that is inserted over the two angled sections.

13. The FWRL as specified in claim 2 wherein the lower surface of said litter base has a plurality of downward-extending protrusions that add to the structural integrity of said litter base.

14. The FWRL as specified in claim 12 wherein said litter base is made of a material selected from the group consisting of plastic or a metal.

15. The FWRL as specified in claim 2 wherein said front and rear wheels are comprised of pneumatic wheels or solid wheels selected from the group consisting of rubber, polyurethane and plastic.

16. The FWRL as specified in claim 2 wherein said front and rear wheels have a diameter that ranges from 8 to 12 inches (20.32 to 30.48 cm).

17. The FWRL as specified in claim 15 wherein the tread on said front and rear wheels is selected to accommodate the terrain where said FWRL is to be deployed.

18. The FWRL as specified in claim 2 wherein said means for attaching said litter base to said lower rail is accomplished by having said litter base include an upper edge terminating with an attachment hook that is dimensioned to fit over said lower rail.

19. The FWRL as specified in claim 17 further comprising a screw that is inserted through the attachment hook and into the lower rail.

20. The FWRL as specified in claim 2 wherein the attachment means for securing the bifurcated second ends of the right and left vertical struts is selected from the group consisting of a cotter pin, a nut and bolt combination, and a screw.

21. The FWRL as specified in claim 2 wherein the right and left vertical strut comprise a first end an a second end, wherein the second end is welded to said FWRLS upper or lower rail.

* * * * *